Figure 1:
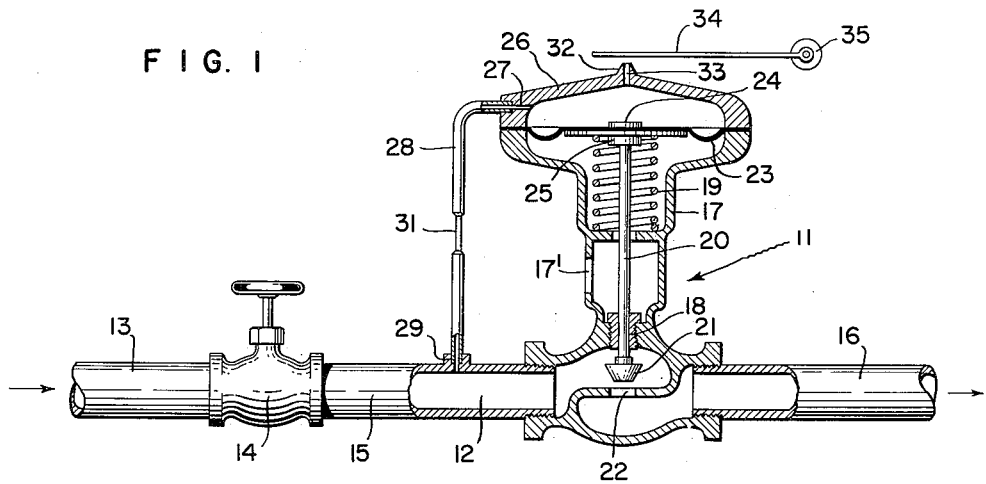

June 13, 1961  R. C. DU BOIS  2,987,920

FLUID PRESSURE TELEMETERING APPARATUS

Filed July 7, 1955

INVENTOR.
Robert Clark Du Bois
BY
Arthur H. Swanson
ATTORNEY.

United States Patent Office 2,987,920
Patented June 13, 1961

2,987,920
FLUID PRESSURE TELEMETERING APPARATUS
Robert Clark Du Bois, Fairfield, Conn., assignor to Minneapolis-Honeywell Regulator Company, Minneapolis, Minn., a corporation of Delaware
Filed July 7, 1955, Ser. No. 520,549
7 Claims. (Cl. 73—388)

A general object of the present invention is to use the rate of flow of a fluid as a means of transmitting the magnitude and changes in magnitude of a variable to a distantly located receiving means. More specifically, the invention provides a new and novel fluid signal transmitter which is characterized by its high speed of transmission.

Another object of the invention is to provide in the signal transmitter a flow measuring device whose output is used to balance a variable fed into the transmitter.

Numerous industrial processes require that different variables such as temperature, pressure, etc. be measured at various points in a process and be observed at a receiving means at some distantly located control station. This necessitates the use of a means for transmitting to the receiving means a signal representative of the magnitude of such a measured variable. Frequently, the exact point at which the variable is measured is in an area where there are explosive gases or liquids which require that nothing present in the vicinity be a possible source of a spark or other igniting condition. To eliminate this hazard it has been found desirable to employ a suitable fluid means as a transmitting medium.

In addition, it is desirable that any change which occurs in the magnitude of the variable fed into the transmitter be rapidly transmitted to the distantly located receiving means so that appropriate corrective action may be made from that location to correct the variable. This rapid transmission of a variable is achieved in the present invention by changing the flow rate of a fluid flowing through a transmission line to a value that is a function of the magnitude of a variable fed into the transmitter.

It is accordingly a further object of the invention to provide a transmitting apparatus which will rapidly transmit in this new manner changes in the magnitude of a variable, through long transmission lines for the aforementioned purpose.

Heretofore pneumatic transmitters that have been employed to transmit signals through long lengths of transmission tubing have used a regulated air supply whose pressure is modulated for transmission in accordance with the magnitude of the variable fed into the transmitter.

Since the transmitter of the present invention transmits a flow signal rather than a regulated air pressure signal, this transmitter has an added advantage over the former in that it can employ either a regulated air supply or liquid such as water from a conveniently located faucet as a medium by which a variable may be transmitted.

It is therefore still another object of the present invention to provide a transmitter which is particularly useful in small process plants which do not possess a regulated air pressure supply source but which do possess an available flow of water or some other liquid from a conveniently located supply source such as a faucet.

The various features of novelty which characterize this invention are pointed out with particularity in the claims annexed to and forming a part of this specification. For a better understanding of the invention, its advantages and specific objects obtained with its use, reference should be made to the accompanying drawings and descriptive matter in which is illustrated and described a preferred embodiment of the invention.

Figure 2:
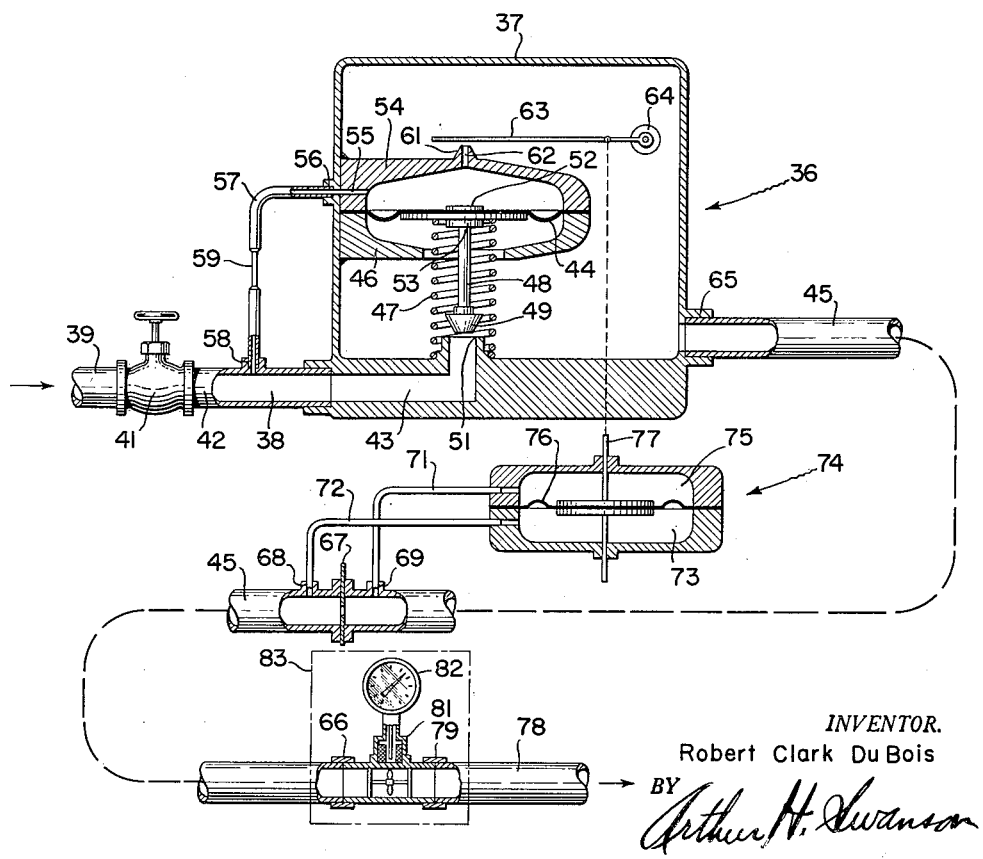

In the drawings:
FIG. 1 shows a schematic arrangement of how the transmitter of the present invention may be operably located in a flow line to control the rate of flow of a continuously flowing fluid passing therethrough;
FIG. 2 shows how a portion of the type of transmitting apparatus shown in FIG. 1 may be encased within a housing and how a flow measuring device may be used as a force balancing unit and a receiving means in the form of a flow meter and flow indicator may be employed with this type of transmitting apparatus.

Unless otherwise noted corresponding components shown in the various figures carry corresponding reference characters.

The form of the transmitter of the present invention, as characterized by reference numeral 11 in FIG. 1, is used to control the flow of fluid 12 flowing in the direction of the arrow from a fluid supply conduit 13, a regulatable valve 14 as shown, or from a faucet, and a conduit 15 to a fluid flow transmitting conduit 16.

This transmitter 11 contains a lower valve casing 17 which in turn contains a conventional valve structure such as a vent 17', a suitable packing gland 18, spring 19, stem 20, a plug 21 fixed to the stem 20, a valve seat 22, a diaphragm 23 and two flanged members 24, 25 for connecting the upper end of the stem to the diaphragm 23.

This transmitter also contains an upper valve casing 26 through the left side of which is an aperture 27. Into this aperture is inserted one end of the conduit 28. The outside wall of the other end of the conduit 28 is shown inserted in another aperture 29 bored into the upper wall of the conduit 15. Between the two ends of the conduit 28 there is a restricted portion 31.

This upper valve casing 26 also contains a nozzle formed by a bulged portion 32 and an aperture 33. A flapper 34 is shown pivoted for rotational movement about the pivot 35 toward or away from the nozzle 32, 33 in accordance with the magnitude of a variable. Although not shown, the apparatus required to transduce the variable into a rotary flapper motion may be, e.g., any commercially available temperature or pressure transducer.

In the operation of the transmitting apparatus shown in FIG. 1, a steady flow of fluid 12 is permitted to flow from a regulable valve 14 as shown, or from a faucet, to the conduit 15. A portion of this continuously flowing fluid passing through this conduit 15 will flow through the aperture formed between the valve seat 22 and the lower portion of the plug 21 and thence to a transmitting conduit 16. Another portion will flow up through a second or restricted conduit 28 into the chamber formed by the diaphragm 23 and the upper valve casing 26. The amount of fluid flow that will be bled from this chamber will depend upon the degree to which the variable will rotate the flapper about its pivot 35. Rotation of the flapper in this manner will cause it to be moved to a position that is closer to or further away from the nozzle 32, 33 than the position shown in FIG. 1.

This flapper motion may be such, for example, that as the magnitude of the variable such as temperature, pressure, not shown, is increased, the flapper will be moved about its pivot away from the nozzle 32, 33 or if the magnitude of the variable is being decreased it will cause a flapper motion toward the nozzle 32, 33 to take place. If such an increase in the magnitude of the variable takes place the flapper will be moved from its position shown in the drawing to a position that is further away from the nozzle. This flapper action will cause a greater amount of fluid to be bled from the upper chamber of the valve casing 26. This increased bleeding action will permit the spring 19 to be moved from a compressed position as shown to an expanded position in which its force has caused the diaphragm 23 and stem means 20, 24, 25 attached thereto to be moved in an upward direction. When this action occurs the plug 21 will be moved away from its seat by an amount that is a function of the change in magnitude of the variable. Such plug lifting action will thus permit a greater amount of fluid to flow from the conduit 15 through the portion between the plug 21 and seat 22 of valve 11 to the transmitting conduit 16.

If, on the other hand, the magnitude of the variable is decreased the flapper 34 will be moved toward the nozzle 32, 33 and a similar but reverse action to that already described would occur. This latter reverse action will thus cause the rate of flow through the transmitting conduit to diminish.

It can readily be seen from the aforementioned description of FIG. 1 that the apparatus shown in this figure is used to transmit an increase or decrease in a variable by increasing or decreasing the flow rate of a continuously flowing fluid passing through a transmission line. It is readily apparent that this flow rate may be, e.g., a weight flow rate or a type of flow rate commonly known as a mass flow rate.

The form of the transmitter shown in FIG. 2 which is characterized by reference numeral 36 differs primarily in two respects with the transmitter 11 shown in FIG. 1. The first difference is that the transmitter 36 is shown enclosed within a housing 37. A second difference is that the flow of fluid 38 that passes in the direction of the arrow from a fluid supply conduit 39 through a regulable valve 41 as shown, or a faucet, passes through not only a conduit 42 but also a passageway 43 formed in the base of the housing 37. The fluid 38 flowing in this manner is thus permitted to pass through the passageway 43 into the interior of the housing 37 and to be applied to the underside of the diaphragm 44 before flowing through an outlet transmission conduit 45.

The transmitter 36 of FIG. 2 contains a lower valve casing 46 fixedly mounted on the housing 37 and which in turn contains a conventional valve structure such as a spring 47, a stem 48, a plug 49 fixed to the stem 48, a valve seat 51, the aforementioned diaphragm 44, and two flange members 52, 53 for connecting the upper end of the stem 48 to the diaphragm 44.

This transmitter 36 also contains an upper valve casing 54 which is also fixedly mounted on the housing 37. Through the left side of this valve casing 54 there is shown an aperture 55. Another aperture 56 which is of a greater diameter than the aperture 55 and which is in alignment with same is shown retaining one end of a second or restricted conduit 57. The outside wall of the other end of this conduit 57 is shown inserted in another aperture 58 bored into the upper surface of the conduit 42 and between the two ends of the conduit 57 there is a restricted portion 59.

This upper valve casing 54 also contains a nozzle formed by an embossed portion 61 and an aperture 62 passing therethrough. A flapper 63 pivoted for rotational movement about a pivot 64 is actuated either toward or away from this nozzle 61, 62 in accordance with the magnitude of a variable applied thereto similarly to the flapper action set out under the description of FIG. 1. Although not shown, any suitable temperature or pressure transducer may be used to convert the magnitude of this variable into the aforementioned flapper motion.

The transmitting conduit 45 shown in FIG. 2 has one of its ends inserted in an aperture 65 and has its other end connected to a coupling member 66. Inserted in this conduit 45 there is shown an orifice plate 67. On either side of the orifice plate 67 there is shown two apertures 68, 69 in the upper surface of the transmitting conduit 45. Into the aperture 69 there is inserted one end of a conduit 71 and into the aperture 68 there is shown inserted one end of conduit 72. The other end of the conduit 71 is shown connected to the upper chamber 75 of a flow measuring means 74 while the other end of the conduit 72 is connected to the lower chamber 73 of this same flow measuring means. Shown located between the upper chamber 75 and lower chamber 73 there is a diaphragm 76 whose upward or downward motion is dependent on the difference in pressure that exists between the pressure in these upper and lower chambers. A connecting means 77 shown schematically in dotted line form is used to transmit movement of this diaphragm 76 back to the flapper 63 to provide for balancing the transmitter flapper input to better stabilize the signal transmitter.

Inserted between the conduits 45 and 78 and connected to their respective couplings 66 and 79 there is shown a receiving means 83 in the form of a flow meter 81 for measuring the flow rate of flow of the fluid 38 passing through the transmission line 45 to the conduit 78. Operably connected to this flow meter 81 there is shown an indicator 82 for indicating the flow rate of flow of the fluid 38 passing through the flow meter.

In the operation of the transmitting apparatus shown in FIG. 2 a steady flow of fluid 38 is permitted to flow from the regulable valve 41 as shown, or from a faucet, on the right end of the conduit 39. A portion of this continuously flowing fluid 38 passing through this conduit 39 will flow through the aperture formed between the valve seat 51 and the lower portion of the plug 49 into the housing 37 and hence to a transmitting conduit 45. Another portion will flow through a second or restricted conduit 57 into the chamber formed by the diaphragm 44 and the upper valve casing 54. The amount of fluid flow that will be bled from this chamber will depend upon the degree to which the variable rotates the flapper 63 about its pivot 64. Rotation of the flapper in this manner will cause it to be moved to a position that is closer to or further away from the nozzle 61, 62 than its position shown in FIG. 2. Since this flapper motion may be the same type of flapper motion as described under the operation of FIG. 1 no further explanation is deemed necessary. Also, since the diaphragm 44 and stem means 52, 53, 48 and plug 49 are activated toward the valve seat 51 in a manner similar to that set out under the description of FIG. 1 no further detailed description of these parts is deemed necessary.

It can thus be seen that from the aforementioned description of FIG. 2 that the apparatus shown in this figure can be used to transmit an increase or decrease in a variable by increasing or decreasing the flow rate of a continuously flowing fluid 38 passing through a housing 37 to a transmission line 45.

It can also be seen from the aforementioned description that the flow measuring means 74, diaphragm 76, and the flapper connecting means 77 may be used to forcebalance the variable flapper input motion of the transmitter 36 as the fluid 38 flows through the transmitting conduit 45.

As the flow rate of the fluid 38 passing through the housing 37 and transmission line 45 changes, the flow meter 81 will sense such a change and cause the indicator 82 to visually indicate its magnitude. The particular arrangement of flow meter 81, 82 shown schematically in FIG. 2 is of a commercially available type. However, any one of the many other types of flow meter which can measure the mass rate of flow may be used to equal advantage with the transmitter set out in this application.

From the aforementioned description of FIGS. 1 and 2 it can readily be seen that this invention enables a rapid and economic transmission of a change in the magnitude of a variable being sent to a distantly located transmitter by controlling the flow rate of a fluid passing through a transmission line.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. A means for expediting the transmission of the instantaneous magnitude of a variable between a fluid bled spring balanced diaphragm actuated valve operably regulated by said variable and a remotely located receiving means, comprising a first conduit, a continuous flow of fluid flowing through said conduit, said valve being operably positioned in said conduit so as to regulate the said flow between two branches of said conduit, a passageway having a restriction therein connecting the said fluid in the first branch of said conduit with a head chamber of said diaphragm actuated valve, a flapper nozzle bleed means arranged to regulate fluid bled from the said head chamber in accordance with the magnitude of the said variable and to cause the valve to modify the flow passing from said first branch to said second branch to a flow rate that is a function of the magnitude of the fluid bled from said valve by said bleed means, a passageway between said fluid in said second branch and said receiving means and means to continuously exhaust said fluid that is received by said receiving means through a conduit having one end open and the other end connected to said receiving means.

2. A means for expediting the transmission of the instantaneous magnitude of a variable between a fluid bled spring balanced diaphragm actuated valve operably regulated by said variable and a remotely located receiving means, comprising a first conduit, a second conduit having a restriction therein connecting a continuous flow of fluid flowing through said first conduit to a head chamber of said diaphragm actuated valve, a regulating means including said diaphragm valve for transmitting a varying rate of flow in said fluid passing through said first conduit to an open ended third conduit, and said regulating means including a flapper nozzle bleed means operably arranged to regulate the fluid bled from said head of said diaphragm actuated valve in accordance with the magnitude of said variable and a receiving means operably connected to the fluid in said third conduit.

3. An apparatus for telemetering changes in the magnitude of a variable between two remote locations, comprising a vehicle for transmitting a continuous flow of fluid to, between and through said locations, a diaphragm operated valve at one of said locations acting to regulate the rate of flow passing through said vehicle to a magnitude which is a function of the said magnitude of said variable, said valve comprising a hollow head chamber having one portion of nozzle shaped configuration above said diaphragm portion, a flapper operably movable towards or away from said nozzle in accordance with the magnitude of said variable, a passageway having one of its ends opening into that portion of said vehicle that is transmitting said rate of flow of fluid to said valve and its other end opening into said head chamber, and a restriction between said two open ends of said passageway.

4. A force balanced telemetering apparatus, comprising a means for telemetering changes in the magnitude of a variable being transmitted between and through two remote locations wherein a flow regulating means at one of said locations is used to regulate the weight flow rate of a fluid passing through and out of a flow line to a value that is a function of the said magnitude of said variable and a flow measuring means positioned in said line having an output connected to balance the variable input to said flow regulating means.

5. A means for telemetering changes in the magnitude of a variable to a remotely located receiving means, comprising an enclosure, a first and second vehicle each having one end opening into said enclosure, a continuously flowing fluid passing through said first vehicle, a restricted passageway connecting the fluid flowing through said first vehicle with a head chamber of a control valve means positioned within said enclosure, said control valve means being operably connected to said vehicles to regulate the flow rate of fluid flowing between the said open ends of said first and second vehicle in accordance with changes occurring in the magnitude of said variable, a bleed port in said head chamber, a means for bleeding said fluid from said head chamber in accordance with the magnitude of said variable and said receiving means being operably connected to said second vehicle at a position remote from its said one end to indicate the change in magnitude of the flow rate of fluid passing therethrough.

6. An apparatus for rapidly transmitting changes in the magnitude of a mechanical motion being applied to a control valve to a remote location by altering the flow rate of a continuously flowing fluid, comprising a conduit having a continuous flow of fluid passing therethrough and out and open end of said conduit, said control valve being directly operable toward or away from a closed position in accordance with the magnitude of said mechanical motion being applied thereto, said actuation of said valve acting to change the flow rate of said fluid flowing through said conduit to a rate that is a function of the magnitude of said mechanical motion and a means for transducing said rate of flow at said remote location into a second mechanical motion proportional to said motion being applied to said control valve.

7. An apparatus for telemetering changes in the magnitude of a condition between a transmitting and receiving station by altering the flow rate of a continously flowing fluid, comprising a unitary passageway positioned to transmit the continuously flowing fluid through each of said stations and out an open end portion of said passageway that is located adjacent said receiving station, a fluid pressure actuated valve operably connected to move toward and away from a closed position in accordance with the magnitude of the condition, said valve being connected to and forming a part of said passageway at said transmitting station and operably positioned therewith to vary the magnitude of the flow rate of said fluid flowing through said passageway in accordance with the magnitude of said condition and a fluid flow rate measuring and indicating means connected to and forming a part of said passageway at said receiving station to indicate the magnitude of said condition in terms of changes in flow rate of the fluid passing through said passageway.

References Cited in the file of this patent

UNITED STATES PATENTS

| 1,014,235 | Laudet et al. | Jan. 9, 1912 |
| 1,909,469 | Hubbard | May 16, 1933 |
| 1,954,514 | Beck | Apr. 10, 1934 |
| 1,977,559 | Lewis et al. | Oct. 16, 1934 |
| 1,985,829 | Hubbard | Dec. 25, 1934 |
| 2,390,301 | Hart | Dec. 4, 1945 |
| 2,536,198 | Matner et al. | Jan. 2, 1951 |
| 2,595,385 | Johnston et al. | May 6, 1952 |
| 2,632,457 | Paulsen | Mar. 24, 1953 |
| 2,803,358 | Dyson | Aug. 20, 1957 |

FOREIGN PATENTS

| 190,825 | Germany | Oct. 30, 1907 |
| 236,563 | Germany | July 7, 1911 |
| 198,691 | Great Britain | Mar. 27, 1924 |